(12) United States Patent
Kim et al.

(10) Patent No.: US 7,585,099 B2
(45) Date of Patent: Sep. 8, 2009

(54) BACKLIGHT UNIT AND LIQUID CRYSTAL DISPLAY DEVICE USING THE SAME

(75) Inventors: Dong Soo Kim, Daegu (KR); Jin-Seob Lim, Gyeongsangbukdo (KR)

(73) Assignee: LG Display Co., Ltd., Seoul (KR)

( * ) Notice: Subject to any disclaimer, the term of this patent is extended or adjusted under 35 U.S.C. 154(b) by 97 days.

(21) Appl. No.: 11/117,288

(22) Filed: Apr. 29, 2005

(65) Prior Publication Data
US 2005/0243573 A1    Nov. 3, 2005

(30) Foreign Application Priority Data
Apr. 30, 2004    (KR) ...................... 10-2004-0030588

(51) Int. Cl.
    *F21V 7/04* (2006.01)
(52) U.S. Cl. .................. 362/614; 362/390; 362/600; 362/632; 362/633; 362/634; 349/58; 349/60; 349/65; 349/67
(58) Field of Classification Search .................. 362/58, 362/60, 65, 225, 600, 614, 390, 632, 634, 362/633, 581; 349/58, 60, 65, 67
See application file for complete search history.

(56) References Cited

U.S. PATENT DOCUMENTS

| | | | | |
|---|---|---|---|---|
| 5,182,660 A | * | 1/1993 | Tanaka | 349/65 |
| 6,295,105 B1 | * | 9/2001 | Lee et al. | 349/65 |
| 6,930,449 B2 | * | 8/2005 | Sasatani et al. | 313/512 |
| 7,011,443 B2 | * | 3/2006 | Chen | 362/633 |
| 2001/0043293 A1 | * | 11/2001 | Inoue | 349/58 |
| 2002/0021383 A1 | * | 2/2002 | Kim | 349/65 |
| 2002/0030771 A1 | * | 3/2002 | Kim | 349/61 |

* cited by examiner

*Primary Examiner*—Sharon E Payne
*Assistant Examiner*—Mary Zettl
(74) *Attorney, Agent, or Firm*—McKenna Long & Aldridge

(57) ABSTRACT

A backlight unit for a liquid crystal display device includes: a lamp; a light guide plate adjacent to the lamp; a reflector under the light guide plate; a lamp housing covering the lamp, the lamp housing being combined with edges of the light guide plate and the reflector; and a housing pad under the lamp housing, the housing pad overlapping an edge of the lamp housing.

15 Claims, 2 Drawing Sheets

BACKLIGHT UNIT AND LIQUID CRYSTAL DISPLAY DEVICE USING THE SAME

The present invention claims the benefit of Korean Patent Application No. 2004-30588, filed in Korea on Apr. 30, 2004, which is hereby incorporated by reference for all purposes as if fully set forth herein.

BACKGROUND OF THE INVENTION

1. Field of the Invention

The present invention relates to a display device, and more particularly, to a backlight unit and a liquid crystal display device using a backlight unit.

2. Discussion of the Related Art

As the information age progresses, flat panel display (FPD) devices having light weight, thin profile, and low power consumption characteristics are being developed and commonly used as a substitute for cathode ray tube (CRT) devices. Generally, display devices may be classified according to their ability for self-emission, and may include emissive display devices and non-emissive display devices. The emissive display devices display images by taking advantage of their ability to self-emit light, and the non-emissive display devices require a light source since they do not emit light by themselves. For example, plasma display panel (PDP) devices, field emission display (FED) devices, and electroluminescent display (ELD) devices are commonly used as emissive display devices. Liquid crystal display (LCD) devices, which may be categorized as non-emissive display devices, are commonly used in notebook and desktop computers because of their high resolution, capability of displaying color images, and high quality image display.

A LCD module of the LCD device includes an LCD panel for displaying images to an exterior and a backlight unit for supplying light to the LCD panel. The LCD panel includes two substrates facing and spaced apart from each other, and a liquid crystal material interposed therebetween. Liquid crystal molecules of the liquid crystal material have a dielectric constant and refractive index anisotropic characteristics due to their long, thin shape. In addition, two electric field generating electrodes are formed on the two substrates, respectively. Accordingly, an orientation alignment of the liquid crystal molecules can be controlled by supplying a voltage to the two electrodes, wherein transmittance of the LCD panel is changed based on polarization properties of the liquid crystal material. However, since the LCD panel is a non-emissive-type display device, an additional light source is required. Thus, a backlight unit is disposed under the LCD panel, wherein the LCD device displays images using light produced by the backlight unit. In general, backlight units may be classified into two types according to a disposition of the light source, such as side-type and direct-type. As display areas of the LCD devices become increasingly larger, direct-type backlight units including a plurality of light sources have become commonly used to provide high brightness.

FIG. 1 is a schematic cross sectional view illustrating a backlight unit of an LCD module according to the related art.

In FIG. 1, an LCD module 1 includes a main support 14 supporting a LCD panel 2 of the LCD module 1, a top case 10 covering the main support 14 and an edge of the LCD panel 2, and a backlight unit 30 under the LCD panel 2. The backlight unit 30 includes an optical element 31 and a light guide plate 24.

Upper and lower polarizers 42 and 40 are disposed on upper and lower surfaces of the LCD panel 2, respectively. Although not shown, the LCD panel 2 includes an upper substrate, a lower substrate facing the upper substrate, and a liquid crystal layer interposed between the upper and lower substrates, wherein the lower substrate includes a plurality of gate lines and a plurality of data lines having a matrix type, and a plurality of thin film transistors connected to each of the plurality of gate lines and plurality of data lines.

More specifically, the top case 10 is bent to cover sides of the main support 14 and the edge of the LCD panel 2, and the main support 14 and the top case 10 are combined by a screw (not shown). Although the main support 14 generally is formed as a mold type, it may further include a metallic material having a characteristic of protection against heat, such as aluminum (Al), with respect to a high brightness television or monitor. A backlight unit 30 is disposed under the main support 14 and includes a backlight lamp 20 as a light source, a lamp housing 16 covering the backlight lamp 20, a light guide plate 24 converting incident light from the lamp 20 into plane light, a reflector 26 on an backside of the light guide plate 24, and the optical element 31 over the light guide plate 24. The optical element 31 has a diffusion sheet 32, an upper prism sheet 36 and a lower prism sheet 34 sequentially laminated over the light guide plate 24. The LCD panel 2 is disposed over the optical element 31, wherein the LCD panel 2 is substantially disposed over the optical element 31 through a protrusion 14a of the support main 14.

The backlight lamp 20 includes, for example, a cold cathode fluorescent lamp (CCFL) and light emitting from the lamp 20 enters the light guide plate 24 through an incident surface defined as a side portion of the light guide plate 24.

The lamp housing 16 reflects light emitting from the backlight lamp 20 toward the incident surface of the light guide plate 24 because the lamp housing 16 includes a reflecting portion on an inner surface thereof. In addition, the light guide plate 24 is manufactured to have a sloped backside and a horizontal front side. The reflector 26 has a role of reducing light loss by reflecting light toward the light guide plate 24 such that incident light reflects through the backside of the light guide plate 24. As a result, when the light emitting from the backlight lamp 20 enters the light guide plate 24, the light is reflected with a predetermined angle on the sloped backside, thereby uniformly progressing with respect to an entire surface of the light guide plate 24. At this time, the light emitted to the lower and side surfaces of the light guide plate 24 enters toward the entire surface by reflecting to the reflector 26. In other words, the light emitting from the light guide plate 24 is diffused on an entire area by the diffusion sheet 32.

In addition, when the incident light is perpendicularly disposed with the LCD panel 2, light efficiency increases. Therefore, the upper and lower prism sheets 36 and 34, may be laminated as two pieces to be perpendicularly disposed with the angle of the light emitting from the light guide plate 24 for the LCD panel 2 in order to increase light efficiency. The light through the diffusion sheet 32 may enter the LCD panel 2 through the upper and lower prism sheets 36 and 34.

However, there is a gap A in an assembly structure of the mentioned backlight unit 30, an interval between the optical element 31 and the LCD panel 2 forms the gap A.

As a result, the gap A leads to a bright line in a portion of the light guide plate 24 where light enters due to the sloped side of the optical element 31. That is, the bright line is shown in the LCD panel 2 adjacent to the lamp 20, wherein the bright line leads to problems such that brightness uniformity of the whole LCD panel 2 is reduced and the whole brightness is decreased. More particularly, in the case that the light guide plate 24 includes a prism pattern, the bright line phenomenon is exacerbated.

SUMMARY OF THE INVENTION

Accordingly, the present invention is directed to a backlight unit and a liquid crystal display device using a backlight unit that substantially obviates one or more of the problems due to limitations and disadvantages of the related art.

An object of the present invention is to provide a backlight unit that can be solved a bright line problem.

An advantage of the present invention is to provide a backlight unit having a high image quality.

Another advantage of the present invention is to provide an LCD having a backlight unit that can be used to solve a bright line problem.

Another advantage of the present invention is to provide an LCD using a backlight unit having a high image quality.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a liquid crystal display device includes: a lamp; a light guide plate adjacent to the lamp; a reflector under the light guide plate; a lamp housing covering the lamp, the lamp housing being combined with edges of the light guide plate and the reflector; and a housing pad under the lamp housing, the housing pad overlapping an edge of the lamp housing.

In another aspect, a liquid crystal display device using a backlight unit includes: a backlight unit including: a lamp; a light guide plate adjacent to the lamp; a reflector under the light guide plate; a lamp housing covering the lamp, the lamp housing being combined with edges of the light guide plate and the reflector; and a housing pad under the lamp housing, the housing pad overlapping an edge of the lamp housing; and a liquid crystal display panel over the backlight unit, the liquid crystal display panel including a first substrate, a second substrate facing the first substrate and a liquid crystal layer interposed between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
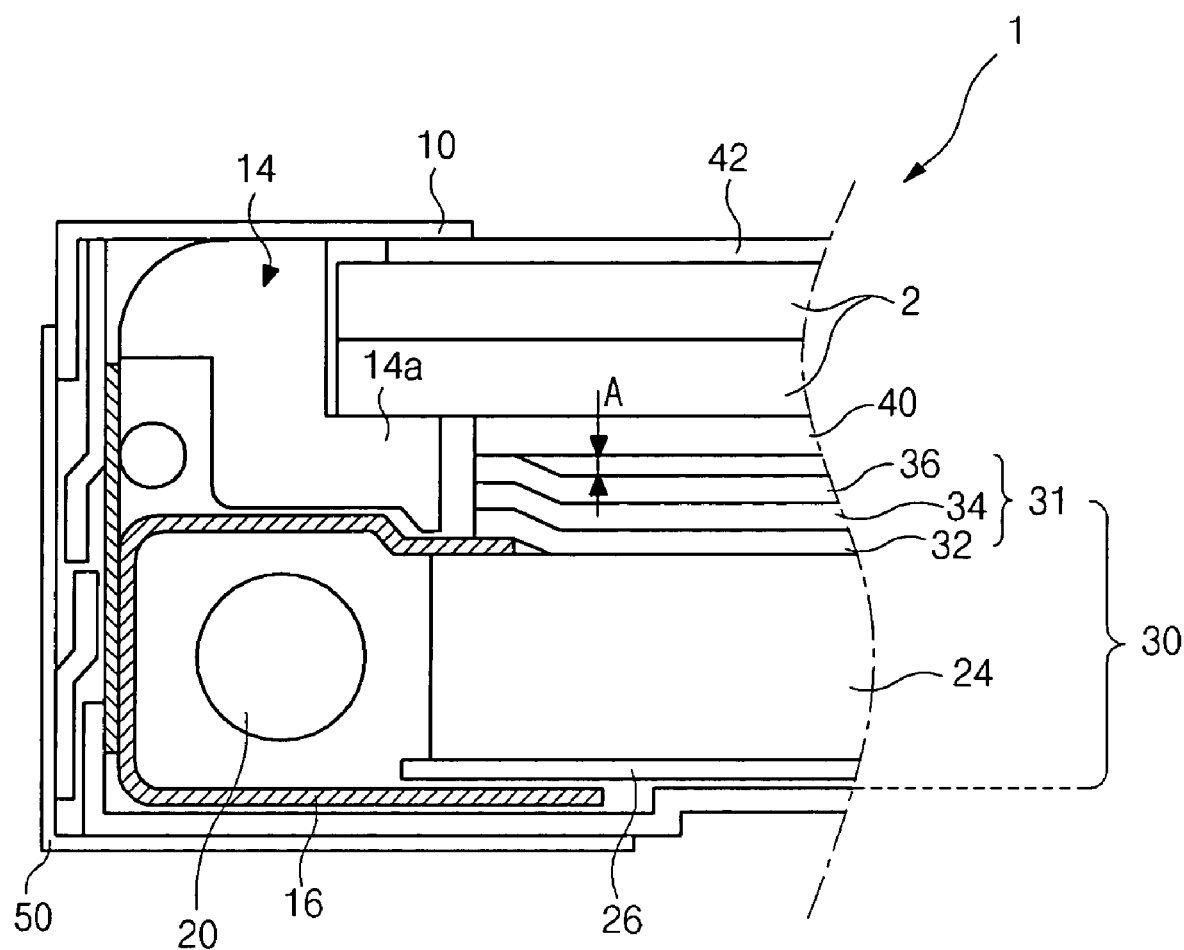
FIG. 1 is a schematic cross sectional view showing a backlight unit of an LCD module according to the related art.
Figure 2:
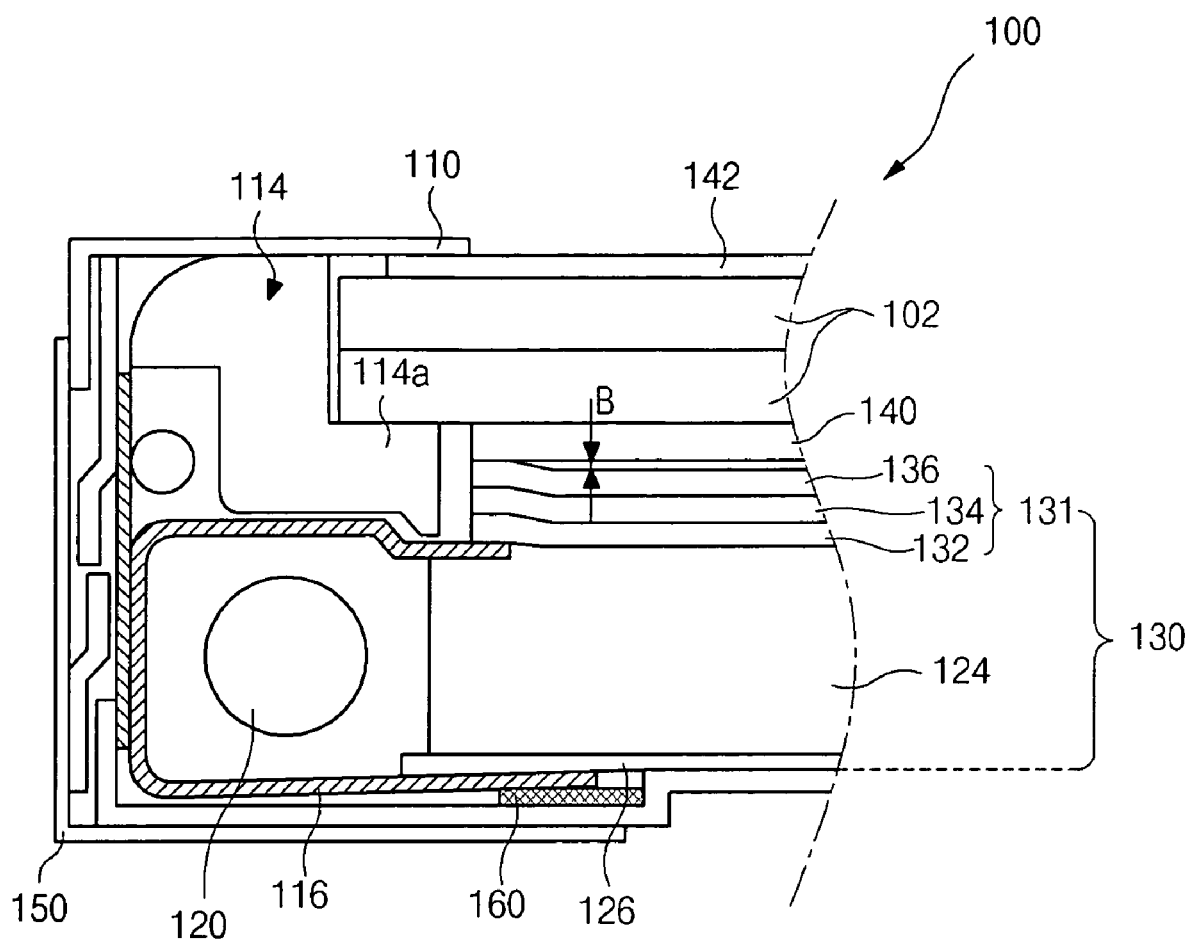
FIG. 2 is a schematic cross sectional view showing a backlight unit of an LCD module according to the present invention.

FIG. 2 is a schematic cross sectional view showing a backlight unit of an LCD module according to the present invention.

In FIG. 2, a backlight unit 130 includes a backlight lamp 120 as a light source, a light guide plate 124 converting the light emitting from the backlight lamp 120 into a plane light and disposed adjacent to an edge of the backlight lamp 120, a reflector 126 reflecting the light from the light guide plate 124 to upper portion and disposed under the light guide plate 124, and a lamp housing 116 covering the backlight lamp 120, wherein edges of the light guide plate 124 and the reflector 126 are inserted in edges of the lamp housing 116 to attach with each other.

At least one optical element 131 is disposed over the light guide plate 124 and an LCD panel 102 attached over the optical element 131. Upper and lower polarizers 142 and 140 are also over the optical element 131. The optical element 131 may include a diffusion sheet 132, an upper prism sheet 136 and a lower prism sheet 134. An edge of the LCD panel 102 is disposed in a main support 114 over the lamp housing 116 and another edge of the LCD panel 102 is covered by a top case 110.

It is noted that the backlight unit 130 further includes a housing pad 160 between the lamp housing and a bottom case 150, wherein the housing pad 160 pushes up the lamp housing 116 corresponding to a portion of the light guide plate 124 in which light enters. The housing pad 160 can reduce a gap B between the LCD panel 102 and the optical element 131. For example, the housing pad 160 may include a tape that is attached to the lamp housing 116 and may have a plate shape.

In other words, the housing pad 160 may be utilized to remove the gap B between the LCD panel 102 and the optical element 131 by being inserted between the lamp housing 116 and the bottom case 150. Therefore, a bright line due to the gap B between the LCD panel 102 and the optical element 131 can be effectively reduced.

For example, the housing pad 160 may include a polyethylene terephthalate (PET) material and a thickness of the housing pad 160 is about 0.1 millimeter. Further, the housing pad 160 may be manufactured in various sizes and shapes and inserted between the bottom case 150 and the lamp housing 116. More specifically, the housing pad 160 may be inserted between the bottom case 150 and a backside edge of the lamp housing 116.

The LCD panel 2, the backlight unit 130, the top case 110 and the bottom case 150 form a LCD module 100 which may be referred as an LCD device.

According to the present invention, a backlight unit 130 and an LCD using a backlight unit does not experience the bright line phenomenon when a housing pad is added between the lamp housing 116 and the bottom case 150.

Although not shown, the LCD panel includes a first substrate, a second substrate facing the first substrate, and a liquid crystal layer interposed between the first and second substrates.

Additionally, a simple process of the backlight unit and a LCD using the same is accomplished without modifying the driving method and the structure thereof, thereby improving productivity in accordance with reduction of a defect rate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A backlight unit for a liquid crystal display device, comprising:
   a lamp;
   a light guide plate adjacent to the lamp;
   a reflector under the light guide plate;
   a lamp housing covering the lamp and including first and second portions, the lamp housing being combined with edges of the light guide plate and the reflector, the first portion of the lamp housing being disposed under the lamp, the second portion of the lamp housing being disposed under the light guide plate;
   a bottom case covering the lamp housing and the reflector and including first and second portion, the first portion of the bottom case is closer to the reflector than the second portion of the bottom case such that the bottom case has a step difference of a first height; and
   a housing pad under the lamp housing, the housing pad overlapping the second portion of the lamp housing,
   wherein the housing pad contacts and pushes up the second portion of the lamp housing such that the second portion of the lamp housing has a greater height from a reference line than the first portion of the lamp housing,
   wherein the housing pad is disposed between the second portion of the lamp housing and the bottom case such that the second portion of the lamp housing has a greater height from a surface of the bottom case than the first portion of the lamp housing,
   wherein the first portion of the bottom case contacts the reflector, and the housing pad is disposed at the second portion of the bottom case.

2. The backlight unit according to claim 1, wherein the housing pad includes a polyethylene terephthalate material.

3. The backlight unit according to claim 1, wherein the housing pad includes a tape attached to the lamp housing.

4. The backlight unit according to claim 1, wherein a thickness of the housing pad is greater than about 0.1 millimeter.

5. The backlight unit according to claim 1, wherein the housing pad has a plate shape.

6. The backlight unit according to claim 1, further comprising:
   at least one optical sheet over the light guide plate;
   a main support over the lamp housing; and
   a top case over the main support, wherein the top case is combined with the bottom case over the main support.

7. The backlight unit according to claim 1, wherein the housing pad directly contacts an edge of the lamp housing.

8. A liquid crystal display device using a backlight unit, comprising:
   a backlight unit including:
   a lamp;
   a light guide plate adjacent to the lamp;
   a reflector under the light guide plate;
   a lamp housing covering the lamp and including first and second portions, the lamp housing being combined with edges of the light guide plate and the reflector, the first portion of the lamp housing being disposed under the lamp, the second portion of the lamp housing being disposed under the light guide plate;
   a bottom case covering the lamp housing and the reflector and including first and second portion, the first portion of the bottom case is closer to the reflector than the second portion of the bottom case such that the bottom case has a step difference of a first height; and
   a housing pad under the lamp housing, the housing pad overlapping the second portion of the lamp housing; and
   a liquid crystal display panel over the backlight unit, the liquid crystal display panel including a first substrate, a second substrate facing the first substrate and a liquid crystal layer interposed between the first substrate and the second substrate,
   wherein the housing pad contacts and pushes up the second portion of the lamp housing such that the second portion of the lamp housing has a greater height from a reference line than the first portion of the lamp housing,
   wherein the housing pad is disposed between the second portion of the lamp housing and the bottom case such that the second portion of the lamp housing has a greater height from a surface of the bottom case than the first portion of the lamp housing,
   wherein the first portion of the bottom case contacts the reflector, and the housing pad is disposed at the second portion of the bottom case.

9. The device according to claim 8, wherein the housing pad includes a polyethylene terephthalate material.

10. The device according to claim 8, wherein the housing pad includes a tape attached to the lamp housing.

11. The device according to claim 8, wherein a thickness of the housing pad is greater than about 0.1 millimeter.

12. The device according to claim 8, wherein the housing pad has a plate shape.

13. The device according to claim 8, further comprising at least one optical sheet over the light guide plate, a main support over the lamp housing, a top case covering the main support and an edge of the liquid crystal panel, and the bottom case being combined with the top case.

14. The device according to claim 8, further comprising at least one optical element over the light guide plate, wherein the housing pad is positioned to push up the lamp housing to reduce a gap between the liquid crystal display panel and the at least one optical element.

15. The backlight unit according to claim 8, wherein the housing pad directly contacts an edge of the lamp housing.

* * * * *